May 21, 1963  H. DIGGELMANN  3,090,922
ELECTRICAL SYNCHRONIZING ARRANGEMENT
Filed Dec. 19, 1960  3 Sheets-Sheet 1

Inventor:
Hans Diggelmann
BY Michael S. Striker
Attorney

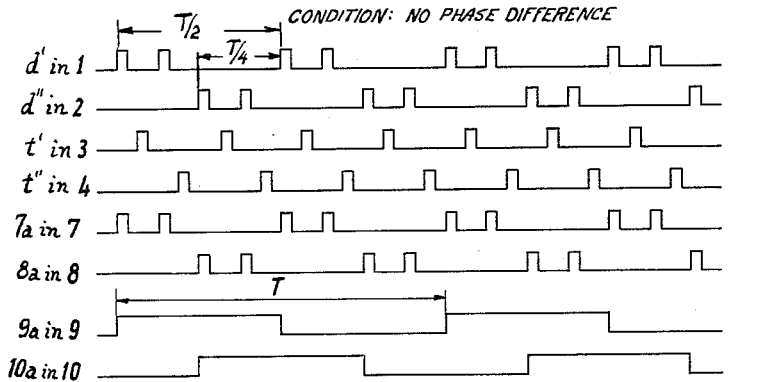
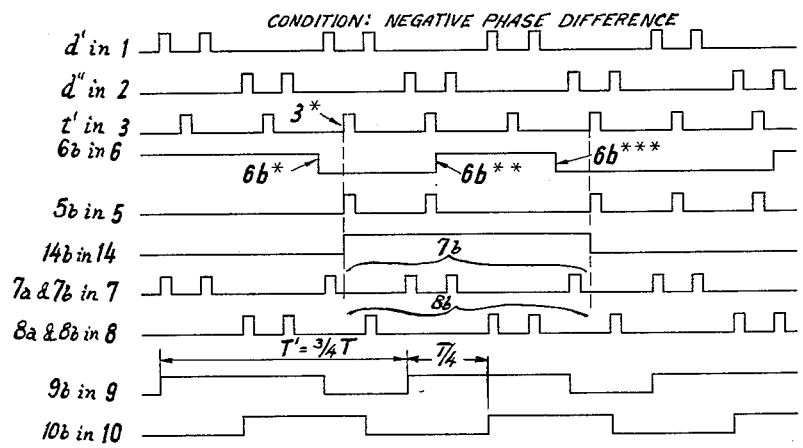
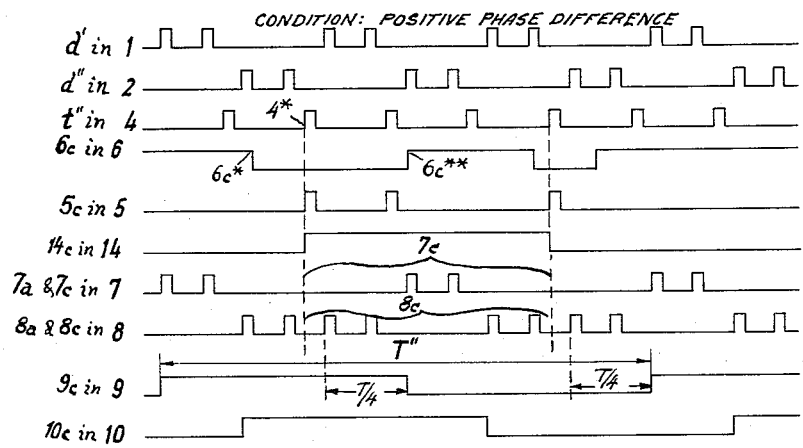

United States Patent Office 3,090,922
Patented May 21, 1963

3,090,922
ELECTRICAL SYNCHRONIZING ARRANGEMENT
Hans Diggelmann, Bern, Switzerland, assignor to
Hasler A.G., Bern, Switzerland
Filed Dec. 19, 1960, Ser. No. 76,967
Claims priority, application Switzerland Dec. 19, 1959
8 Claims. (Cl. 328—72)

The present invention concerns an electrical synchronizing arrangement which serves to adjust the periodicity of a periodic signal to phase equality with another periodic signal.

Either one of these signals may be in the form of a pulse sequence or of an alternating current. The arrangement according to the invention can be used in several ways: The adjusted or synchronized signal may be used directly e.g. in communication systems, and the synchronized signal may be used for energizing a synchronous motor which is intended to operate in synchronism with an existing alternating current not used for energizing the particular motor, or in synchronism with another motor which is not energized by the same source of alternating current.

Fundamentally, the arrangement according to the invention comprises impulse generator means, electrically controllable change-over switch means and control means for controlling the switch means.

The impulse generator device produces two distinct periodic sequences of pulse groups which have the same frequency but are offset in phase relative to each other, and it furnishes furthermore at least one separate sequence of periodic single pulses which have a fixed predetermined time relationship with respect to the pulse groups.

The electrically controllable change-over switch device is capable of changing, in response to the application of a control pulse, between a condition in which the first and the second one of said periodic sequences of pulse groups appear, respectively, at a first and a second output of the switch device, and a second condition in which the first pulse group sequence appears at the second output while the second pulse group sequence appears at the first output of the switch device.

The control device is changeable between an idle condition and an operative condition. It is connected between the separate pulse output of the pulse generator device and the switch device in such a manner that, when the control device is in operative condition, it responds to the first one of the above mentioned single pulses applied thereto after a change to operative condition, by applying a control pulse to the switch device for causing a change between the above mentioned conditions thereof. As will be shown, by such change between the conditions of the switch means the periodicity of pulses appearing at the outputs of the switch means is varied.

It is one of the objects of the invention to provide for an arrangement for synchronizing a periodic signal to phase equality with another periodic signal by means of a comparatively small number of conventional components.

Other objects will become apparent from the following description of embodiments of the invention.

With these objects in view, an electrical synchronizing arrangement for adjusting the periodicity of a periodic signal to phase equality with another periodic signal, comprises according to the invention, in combination, impulse generator meatns capable of producing two distinct periodic sequences of pulse groups, said sequences having the same frequency, but being offset in phase relative to each other, said generator means having two main outputs for delivering separately said sequences, respectively, said generator means being further capable of producing at least one separate sequence of periodic single pulses having a fixed predetermined time relationship with respect to said pulse groups, and at least one separate output for delivering said single pulses; electrically controllable change-over switch means having a first and a second input respectively connected with said main outputs of said generator means, and at least one output, and being capable of changing, in response to the application of a control pulse, between a condition in which said first input is connected with said output thereof, and a condition in which said second input is connected with said output thereof; and control means connected between said switch means and said separate output of said generator means, and capable of change between an idle condition and an operative condition in which said control means responds to the first one of said single pulses applied thereto after such change to operative condition, by applying said control pulse to said switch means for causing a change between said conditions thereof, whereby the periodicity of pulses appearing at said outputs of said switch means is varied.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
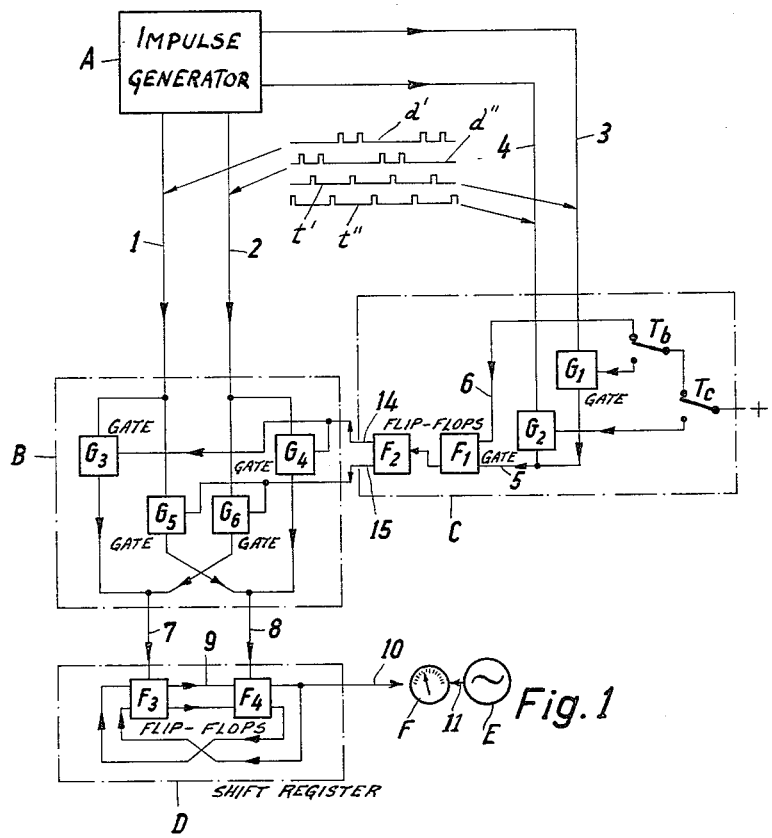
FIG. 1 is a schematic circuit diagram illustrating a preferred embodiment of the invention which permits the elimination both of positive and of negative phase differences and which delivers a rectangular output voltage.
Figure 6:
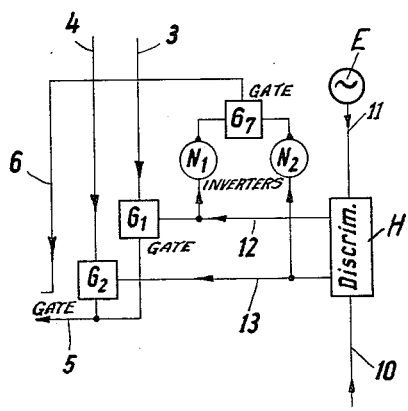

FIGS. 3, 4 and 5 are graphs illustrating various pulse sequences in their time relations, FIG. 3 illustrating particularly the case where no phase difference exists, FIG. 4 illustrating the case of a negative phase difference, and FIG. 5 illustrating the case of a positive phase difference; and FIG. 6 illustrates a modification of a portion of the arrangement of FIG. 1, namely of the control device C.

The arrangement according to FIG. 1 comprises as main components an impulse generator A, a change-over switch arrangement B, a control device C for controlling the switch arrangement B, and a shift register D. For the sake of completeness FIG. 1 shows also a source E furnishing on a line 11 a periodic signal, and an indicating device F of conventional type for comparing and indicating phase differences between the signal in line 11 and an output signal appearing in the output line 10 of the arrangement according to the invention.

The impulse generator arrangement A of conventional design has two main outputs connected respectively with the lines 1 and 2 and delivers into the lines 1 and 2 distinct periodic sequences of pulse groups, diagrammatically illustrated as an insert in FIG. 1, namely a sequence $d'$ of groups of two pulses each into line 1, and a sequence $d''$ of groups of two pulses each into line 2, each group of two pulses of the sequence $d'$ being timed to occur during an interval between consecutive groups of two pulses in the sequence $d''$. The generator arrangement A has two further outputs connected with the lines 3 and 4, respectively, into which the generator delivers sequences $t'$ and $t''$, respectively, composed of single pulses having twice the frequency of the sequences $d'$ and $d''$, each single pulse of the sequence $t'$ delivered into line 3 being located in the interval between two pulses of a group of the sequence $d'$ or $d''$. Each single pulse of the sequence $t''$ applied to line 4 is located in the interval between a pulse group of sequence $d'$ and a pulse group of the sequence $d''$. In this example the arrangement is such that the frequency of the sequences $d'$ and $d''$ is approximately twice as high as the frequency of the signal delivered by the source E into line 11 which is the periodic signal with which the output of the arrangement A, B, C, D is to be synchronized.

In the graphs shown by FIGS. 3, 4 and 5 the pulses appearing in the various components of the arrangement are illustrated in proper time relationship. For each graph line a reference symbol indicating the particular pulses is marked at the left hand side of the drawing together with an indication as to the particular line or component in which the particular pulses appear. Pulses which appear in a particular line are differentiated between FIGS. 3, 4 and 5 by an affixed letter $a$, $b$, $c$, respectively, corresponding to the different conditions of the switch device B.

The switch device B comprises four gates $G_3$, $G_4$, $G_5$ and $G_6$. As can be seen from FIG. 1 the line 1 is connected with the output line 7, and the line 2 is connected with the output line 8 whenever the gates $G_3$ and $G_4$ are in conductive condition while the gates $G_5$ and $G_6$ are in non-conductive condition. On the other hand, the line 1 is conductively connected with the output line 8 and the line 2 is conductively connected with the output line 7 whenever the gates $G_3$ and $G_4$ are non-conductive while the gates $G_5$ and $G_6$ are in conductive condition.

The control device C comprises two gates $G_1$ and $G_2$, two flip-flop devices $F_1$ and $F_2$, and also two manually operable switches $T_b$ and $T_c$. The latter switch is connected with an outside source of positive potential. In the normal position as shown the positive potential keeps, via the switches $T_b$ and $T_c$ the flip-flop $F_1$ in one of its stable conditions. By moving the switch $T_b$ (or $T_c$) to its other position the gate $G_1$ (or $G_2$, respectively) is rendered conductive and under these conditions the next occurring single pulse from the sequence $t'$ appearing at the gate $G_1$ (or the similar next pulse from the sequence $t''$ appearing at the gate $G_2$) will switch the flip-flop device $F_1$ to its opposite stable condition whereby the second flip-flop device $F_2$ is caused to change its condition. The flip-flop device $F_2$ has two output lines 14 and 15 one of which controls the above mentioned gates $G_3$ and $G_4$, while the other output line controls the gates $G_5$ and $G_6$. Thus by the changing of the flip-flop device $F_2$ between its conditions the gates $G_3$ and $G_4$ are rendered non-conductive and the gates $G_5$ and $G_6$ are rendered conductive provided that before this moment the gates $G_3$ and $G_4$ have been conductive and the gates $G_5$ and $G_6$ have been non-conductive. On the other hand, under the same conditions the gates $G_3$ and $G_4$ are rendered conductive and the gates $G_5$ and $G_6$ are rendered non-conductive provided that before this instant the gates $G_3$ and $G_4$ have been non-conductive and the gates $G_5$ and $G_6$ have been conductive. As soon as the switch $T_b$ (or $T_c$) is released and returned to normal position, the flip-flop device $F_1$ returns, under the influence of the voltage appearing in the line 6, to its previous condition without however influencing in any way the condition of the second flip-flop device $F_2$. Hereafter the flip-flop device $F_1$ is again ready to be changed to opposite condition by a single pulse through line 3 (or line 4) following a change of position of the switch $T_b$ (or $T_c$) whereby again the flip-flop device $F_2$ would be changed to opposite position with a result that again the condition of the switch device B would change as described above.

Thus, it can be seen that when the switches $T_b$ and $T_c$ are in their normal position and therefore the control device C is in idle condition, the line 1 is conductively connected with the output line 7 and the line 2 is conductively connected with the output line 8 and that an actuation of the switches $T_b$ or $T_c$ causes the switch device B to change its condition upon the arrival of the next one of the single pulses through lines 3 or 4, respectively, immediately after the operation of the switches, so that thereafter the line 1 is connected with the output line 8 and the line 2 is connected with the output line 7 and remains so until either one of the switches $T_b$ or $T_c$ is actuated again.

The shift register D comprises, as register elements, two flip-flop devices $F_3$ and $F_4$. To serve as control inputs, the line 7 is connected to the shift pulse input of flip-flop $F_3$ and output line 8 is connected to the shift pulse input of flip-flop $F_4$. The outputs of the flip-flop $F_3$ are connected to the inputs of the flip-flop $F_4$, and the outputs of the flip-flop $F_4$ are connected with reversed polarity with the inputs of the flip-flop $F_3$. A shift pulse applied to flip-flop $F_3$ from the output and control line 7 causes the flip-flop $F_3$ to receive an output signal from the flip-flop $F_4$ with reversed polarity. On the other hand, a shift pulse applied to flip-flop $F_4$ from the output and control line 8 causes the flip-flop $F_4$ to receive information stored in the flip-flop $F_3$ without change of polarity.

Figure 2:
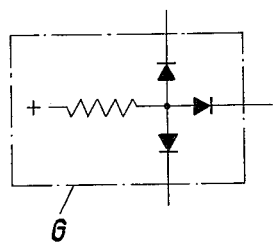
FIG. 2 is a detailed diagram of one element of the arrangement according to FIG. 1.

Since, in FIG. 1 all the gates have been shown only as block diagrams, FIG. 2 will serve to illustrate a conventional form of a gate which can be used advantageously for all the gates $G_1$ to $G_6$ as well as for a gate $G_7$ referred to further below.

In operation, the arrangement according to FIG. 1 functions as follows:

Reference is made to FIG. 3 which applies to the case where no phase difference exists between the output signals appearing in the output line 10 of the arrangement and the reference signal appearing in line 11 as output of the source E.

As long as the control device C is in idle condition because none of the switches $T_b$ and $T_c$ have been moved from their normal position as shown, all the pulses occur as illustrated by FIG. 3, it being assumed that the condition of the switch device B is such that the gates $G_3$ and $G_4$ are conductive and the gates $G_5$ and $G_6$ are non-conductive. For the reasons set forth the gates $G_1$ and $G_2$ are non-conductive so that the single pulses of the sequences $t'$ and $t''$ arriving through lines 3 and 4 have no effect. Consequently, the switch device B remains in its existing condition and the output pulses $7a$ and $8a$ appearing in the output lines 7 and 8 coincide with and correspond exactly to the pulse sequences $d'$ and $d''$ furnished through the lines 1 and 2, respectively. The first pulse of each double pulse of the sequence $7a$ has the result that the output signal of the flip-flop $F_4$ which has been received as output signal from the flip-flop $F_3$ upon the preceding occurrence of a double pulse out of the sequence $8a$, is now received by the flip-flop $F_3$ with reversed polarity which means that now the flip-flop $F_3$ is changed to opposite condition because it obtains a signal opposite to its previous condition. Thus the flip-flop device $F_3$ changes its condition upon the arrival of each one of the double pulses of the sequence $d'$ through line 1. From this results an output voltage $9a$ in the output line 9. In a similar manner an output voltage $10a$ appears in the output line 10. As can be seen the output in line 9 and in line 10 each takes the form of a rectangular voltage, the frequency of this pulsation being equal to one half of the frequency of the sequences of pulse groups $d'$ and $d''$ furnished through lines 1 and 2, respectively, and in phase with the signal in line 11.

FIG. 4 applies to a case where the phase of the output signal $9a$, $10a$ trails the phase of the reference signal in line 11 (negative phase difference). In order to obtain synchronization, in this case the switch $T_b$ is to be actuated and moved into open position. Hereby the gate $G_1$ is rendered conductive at an instant which is marked in FIG. 4 at $6b^*$, and the next following one of the single pulses out of the series $t'$, marked in FIG. 4 at $3^*$ switches the flip-flop $F_1$ to opposite condition whereby the flip-flop $F_2$ is switched to opposite condition and hereby the gates G₃ and G₄ are rendered non-conductive while the gates G₅ and G₆ are rendered conductive. Consequently, the output line 7 which up to this moment has received pulses 7a corresponding to the pulses of the sequence d', receives now pulses 7b which correspond to the pulse sequence d", while the output line 8 which up to this moment had received impulses 8a corresponding to the sequence d", receives now pulses 8b corresponding to the pulse sequence d'. Each first pulse of a double pulse of the sequences d' and d" and each single pulse appearing in the output lines 7 or 8, respectively, results in a change of condition of the flip-flop F₃ or F₄, respectively, whereby the signal sequence 9b appears in output line 9 and the signal sequence 10b appears in the output line 10. By comparing the showing of FIGS. 3 and 4 with each other it can be seen that in the procedure according to FIG. 4 the period T of the pulses 9a (FIG. 3) during which the switch T_b has been moved to open position, has been shortened to a period length T' which differs from T by T/4. Consequently the periodicity of the output pulses has been shortened and thus adjusted toward phase equality with the reference signal in line 11. It can be seen further, that the return of switch T_b to normal position at the time marked in FIG. 4 at 6b** does not affect the condition of the switch device B because in this case the flip-flop F₂ does not deliver an output signal under these circumstances, as mentioned above.

FIG. 5 illustrates the pulse relations in the case where the output signal in the output lines 9, 10 is leading the signal in the line 11 with which it is to be synchronized i.e. where the phase difference is positive. In this case the switch T_c is to be actuated and moved to open position. The only difference between the resulting change of the control device C to operative condition as compared with the operation illustrated by FIG. 4 consists in fact that it is not the single pulse out of the pulse sequence t' in line 3 but the first one of the single pulses of the sequence t" in line 4 immediately following the opening of the switch T_c which causes the change of condition of the change-over switch device B. The moment of opening the switch T_c is marked in FIG. 5 at 6c* and the single pulse just mentioned above is marked at 4*. Consequently the pulse 5c appears in line 5 and the signal 14c is delivered through line 14 so as to render the gates G₃ and G₄ non-conductive while at the same time via line 15 the gates G₅ and G₆ are rendered conductive. Consequently at the instant marked 4* which is different from the time of the pulse 3* in FIG. 4, the impulse sequence d' in line 1 will appear at the output line 8 in the form of a pulse sequence 8c, while the impulse sequence d" in line 2 will appear in the output line 7 as a sequence 7c. It can be seen from FIG. 5 that the resulting output signal 9c in output line 9 and 10c in output line 10 are longer than the period of the signals 9a and 10a in output lines 9 and 10, respectively, as shown in FIG. 3. Hereby the periodicity of the output signals of the arrangement is changed in negative direction toward synchronism with the reference signal in line 11.

After the just described procedure the switch device B remains in the thus attained condition until either one of the switches T_b or T_c is actuated and moved to open position again. If this occurs, i.e. if the switch T_b (or T_c) is operated, the switch device B is again changed to opposite condition by one of the single pulses from sequence t' in line 3 (or one of the single pulses of sequence t" in line 4) so that thereafter again the line 1 is conductively connected with output line 7 and line 2 is connected conductively with output line 8 so that again in the first case the period T of the signals 9a and 10a is shortened to that of the signals 9b and 10b, respectively (and in the other case is extended to the length of the periods of the output signals 9c and 10c, respectively). By way of example such a second actuation of the switch T_b is indicated in FIG. 4 at 6b***. Thus it can be seen that the synchronization or change of periodicity of the output signals is controlled solely by the change of the existing condition of the change-over switch device B irrespective of whether the change is from a first condition to a second condition or from a second condition to a first condition, while the negative or positive character of the phase correction or of the change of periodicity depends only upon the instant when the change of condition of the switch device B is effected which instant depends upon the moment when after actuation of the control device C the first one of the single pulses of the sequences t' or t" in lines 3 or 4, respectively, occurs.

The rectangular voltage signals in the output lines 9 or 10 may be used directly depending upon the type of equipment with which the arrangement according to the invention is used, or it may be converted first into a sinusoidal voltage. Also, it is possible to omit the shift register D in which case only one of the output lines 7 or 8 is required, the output voltage appearing therein being used either directly or after conversion into a sinusoidal voltage. In the case of omission of the shift register D either the gates G₄ and G₅ or the gates G₃ and G₆ can be omitted likewise.

The switches T_b and T_c may be of the push button type. However, these switches as shown in FIG. 1 can be omitted entirely and replaced by a circuit as shown by FIG. 6. In this case a phase discriminator H of conventional type may be connected between the lines 10 and 11 and connected with the gates G₁ and G₂ through a network comprising two inverters or negators N₁ and N₂ and a further gate G₇. By this arrangement a single pulse out of the sequence t' or t" from lines 3 or 4, respectively, is put into effect for shortening or extending, respectively, the period of the rectangular voltage signals 9 or 10 whenever negative or positive phase difference exists between these signals and the reference signal in line 11.

Those elements of the circuit of FIG. 6 which are identical with corresponding elements in FIG. 1 have the same reference numerals. The discriminator H compares the phase of the signal in line 10 with the phase of the signal in the line 11. As long as there is no phase difference the discriminator H delivers no voltage into either one of the lines 12 and 13. Then the line 6 connected with the combination of inverters or negators N₁ and N₂ and gate G₇ obtains the same voltage which appears in line 6 according to FIG. 1 when both switches T_b and T_c are in normal position as shown. However, when the signal in line 10 has a phase trailing the phase of the reference signal in line 11, then the discriminator H delivers voltage into line 12; on the other hand when the phase of the signal in line 10 trails the signal in line 11, then a voltage is delivered into line 13. The voltage in line 12 has the effect of rendering the gate G₁ conductive and simultaneously cuts off voltage supply to the line 6 which results in the same condition which is obtained in the embodiment according to FIG. 1 by opening the switch T_b, so that, as explained above, the corresponding period of the output signal voltages 9 and 10 occurring at this moment is shortened whereby a positive phase shift of these signals relative to the reference voltage in line 11 is obtained and thus the phase difference detected by the discriminator H is compensated. In an analogous way, when the phase of the signals in lines 9 and 10 leads that of the reference signal in line 11, a voltage is delivered by the discriminator H through line 13 which results in rendering the gate G₂ conductive and again cutting off voltage supply to line 6. This is the same effect which was obtained in the embodiment according to FIG. 1 by opening the switch T_c whereby, as explained above, the period of the signal in lines 9 and 10 occurring at this moment is extended whereby again the positive phase difference is compensated. After a phase difference of one or the other character has been compensated the lines 12 and 13 are again without voltage and the same condition is established which occurred in the embodiment of FIG. 1 when the switches $T_b$ and $T_c$ are in their normal position.

As can be seen from a comparison of FIGS. 3, 4 and 5 with each other, the absolute value of the phase shift or change of periodicity obtained by the arrangement according to the invention amounts to ¼ of the basic period T. In order to assure a stable operation of the arrangement according to FIGS. 1 and 6 it is necessary that the output voltages of the discriminator H applied to the lines 12 and 13, respectively, render the gate $G_1$ (or $G_2$) conductive and cut off voltage at the output terminals of the inverter $N_1$ (or $N_2$) only when the phase difference between the signals in lines 10 and 11 amounts to more than ⅛ of the basic period T.

It will be understood that each of the elements described above, or two or more together, may also find a useful application in other types of electrical synchronizing arrangement differing from the types described above.

While the invention has been illustrated and described as embodied in electrical synchronizing arrangement for adjusting a periodicity of a periodic signal to phase equality with another periodic signal, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Electrical synchronizing arrangement for adjusting the periodicity of a periodic signal to phase equality with another periodic signal, comprising, in combination, impulse generator means capable of producing two distinct periodic sequences of pulse groups, said sequences having the same frequency, but being offset in phase relative to each other, said generator means having two main outputs for delivering separately said sequences, respectively, said generator means being further capable of producing at least one separate sequence of periodic single pulses having a fixed predetermined time relationship with respect to said pulse groups, and at least one separate output for delivering said single pulses; electrically controllable change-over switch means having a first and a second input respectively connected with said main outputs of said generator means, and at least one output, and being capable of changing, in response to the application of a control pulse, between a condition in which said first input is connected with said output thereof, and a condition in which said second input is connected with said output thereof; output means for delivering output pulses appearing at said output of said change-over switch means; and control means connected between said switch means and said separate output of said generator means, for receiving said single pulses, and capable of change between an idle condition and an operative condition, said control means, when in operative condition, responding to the first one of said single pulses received after such change to operative condition, by applying said control pulse to said switch means for causing a change between said conditions thereof, whereby the periodicity of output pulses appearing at said outputs of said switch means is varied.

2. Electrical synchronizing arrangement for adjusting the periodicity of a periodic signal to phase equality with another periodic signal, comprising, in combination, impulse generator means capable of producing two distinct periodic sequences of pulse groups, said sequences having the same frequency, but being offset in phase relative to each other, said generator means having two main outputs for delivering separately said sequences, respectively, said generator means being further capable of producing at least one separate sequence of periodic single pulses having a fixed predetermined time relationship with respect to said pulse groups, and at least one separate output for delivering said single pulses; electrically controllable change-over switch means having a first and a second input respectively connected with said main outputs of said generator means, and a first and a second output, and being capable of changing, in response to the application of a control pulse, between a condition in which said first input is connected with said first output thereof, while said second input is connected with said second output thereof, and a condition in which said first input is connected with said second output thereof, while said second input is connected with said first output thereof; output means for delivering output pulses appearing at either one of said first and second outputs of said change-over switch means; and control means connected between said switch means and said separate output of said generator means, for receiving said single pulses, and capable of change between an idle condition and an operative condition, said control means, when in operative condition, responding to the first one of said single pulses received after such change to operative condition, by applying said control pulse to said switch means for causing a change between said conditions thereof, whereby the periodicity of output pulses appearing at said outputs of said switch means is varied.

3. Electrical synchronizing arrangement for adjusting the periodicity of a periodic signal to phase equality with another periodic signal, comprising, in combination, impulse generator means capable of producing two distinct periodic sequence of pulse groups, said sequences having the same frequency, but being offset in phase relative to each other, said generator means having two main outputs for delivering separately said sequences, respectively, said generator means being further capable of producing a first and a second separate sequence of periodic single pulses having, respectively, fixed predetermined time relationships with respect to said pulse groups, and a first and a second separate output for delivering, respectively, said first and second sequence of said single pulses; electrically controllable change-over switch means having a first and a second input respectively connected with said main outputs of said generator means, and a first and a second output, and being capable of changing, in response to the application of a control pulse, between a condition in which said first input is connected with said first output thereof, while said second input is connected with said second output thereof, and a condition in which said first input is connected with said second output thereof, while said second input is connected with said first output thereof; output means for delivering output pulses appearing at either one of said first and second outputs of said change-over switch means; and control means connected between said switch means and said separate outputs of said generator means, for receiving said single pulses, and capable of change between an idle condition and an operative condition, said control means, when in operative condition, responding to the first one of said single pulses received after such change to operative condition, by applying said control pulse to said switch means for causing a change between said conditions thereof, whereby the periodicity of output pulses appearing at said outputs of said switch means is varied.

4. Electrical synchronizing arrangement for adjusting the periodicity of a periodic signal to phase equality with another periodic signal, comprising, in combination, impulse generator means capable of producing two distinct periodic sequences of pulse groups, said sequences having the same frequency, but being offset substantially 180° in phase relative to each other, said generator means having two main outputs for delivering separately said sequences, respectively, said generator means being further capable of producing a first and a second separate sequence of periodic single pulses having, respectively, fixed predetermined time relationships with respect to said pulse groups, the time of the individual single pulses of said first sequence thereof substantially coinciding with the occurrence of said pulse groups of said two distinct sequences thereof, and the time of the individual single pulses of said second sequence thereof substantially coinciding with a midpoint between the occurrences of said pulse groups, and a first and a second separate output for delivering, respectively, said first and second sequence of said single pulses; electrically controllable change-over switch means having a first and a second input respectively connected with said main outputs of said generator means, and a first and a second output, and being capable of changing in response to the application of a control pulse, between a condition in which said first input is connected with said first output thereof, while said second input is connected with said second output thereof, and a condition in which said first input is connected with said second output thereof, while said second input is connected with said first output thereof; output means for delivering output pulses appearing at either one of said first and second outputs of said change-over switch means; and control means connected between said switch means and said separate outputs of said generator means, for receiving said single pulses, and capable of change between an idle condition and an operative condition, said control means, when in operative condition, responding to the first one of said single pulses received after such change to operative condition, by applying said control pulse to said switch means for causing a change between said conditions thereof, whereby the period of the output pulses appearing at said outputs of said switch means and during which said control means is changed between idle and operative condition, is extended or shortened depending upon which of said separate pulse sequences the first single pulse occurring after such change is derived from.

5. An arrangement as claimed in claim 4, wherein said control means include manually operable switch means and control means in circuit with an outside source of electric energy for electrically changing said control means between idle and operative conditions.

6. An arrangement as claimed in claim 4, wherein said control means include phase discriminator means connected to receive both said output pulses appearing at said outputs of said switch means and pulses constituting said other periodic signal, and capable of delivering a control pulse to said switch means whenever a phase difference greater than a predetermined minimum magnitude exists between said output pulses and other periodic signal.

7. An arrangement as claimed in claim 4, wherein each of said pulse groups consists of two consecutive pulses, and wherein said individual single pulses of said first sequence thereof coincide respectively with the intervals between said two consecutive pulses of said pulse groups.

8. An arrangement as claimed in claim 2, wherein said output means include shift register means having at least a first and a second register element so interconnected and so connected with said first and second outputs, respectively, of said switch means that an output pulse appearing at said first output means causes said first register element to receive an output signal from said second register element with reversed polarity, and that an output pulse appearing at said second output causes said second register element to receive a signal stored in said first register element without change of polarity, one of said register elements having an output for delivering a rectangular output voltage derived from said output pulses with adjusted periodicity.

References Cited in the file of this patent
UNITED STATES PATENTS
2,970,761   Beranger _____ Feb. 7, 1961